(12) United States Patent
Flachs et al.

(10) Patent No.: US 7,197,655 B2
(45) Date of Patent: Mar. 27, 2007

(54) LOWERED PU POWER USAGE METHOD AND APPARATUS

(75) Inventors: Brian King Flachs, Georgetown, TX (US); John Samuel Liberty, Round Rock, TX (US); Harm Peter Hofstee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 10/606,581

(22) Filed: Jun. 26, 2003

(65) Prior Publication Data

US 2004/0268164 A1    Dec. 30, 2004

(51) Int. Cl.
*G06F 1/00* (2006.01)

(52) U.S. Cl. ..................... 713/324; 713/320

(58) Field of Classification Search ......... 713/300–340
See application file for complete search history.

(56) References Cited

U.S. PATENT DOCUMENTS

| | | | |
|---|---|---|---|
| 5,495,617 A * | 2/1996 | Yamada | 713/323 |
| 6,079,008 A * | 6/2000 | Clery, III | 712/11 |
| 6,219,796 B1 * | 4/2001 | Bartley | 713/320 |
| 6,711,691 B1 * | 3/2004 | Howard et al. | 713/300 |
| 6,795,930 B1 * | 9/2004 | Laurenti et al. | 713/324 |
| 6,845,445 B2 * | 1/2005 | Marchand et al. | 713/100 |
| 6,898,721 B2 * | 5/2005 | Schmidt | 713/322 |
| 6,971,038 B2 * | 11/2005 | Santhanam et al. | 713/324 |
| 6,983,389 B1 * | 1/2006 | Filippo | 713/324 |
| 2004/0268091 A1 * | 12/2004 | Pessolano | 712/215 |

* cited by examiner

*Primary Examiner*—Lynne H. Browne
*Assistant Examiner*—James F. Sugent
(74) *Attorney, Agent, or Firm*—Carr LLP; Diana R. Gerhardt

(57) ABSTRACT

Disclosed is an apparatus which places computer program instructions into instruction channels in accordance with predefined criteria such that at least some external event instructions are placed in a special "blocking channel." The number of instructions, in a channel, is monitored in channel specific counters. When a computer processor is awaiting a response from an external entity event (in other words, is blocked from proceeding with the operation the PU is attempting), as signified by the blocking counter being at a predetermined value, the entire PU or at least processor auxiliary components that would be idle, such as math logic, while awaiting an external event response, are deactivated to save power until an awaited external event response is received.

16 Claims, 2 Drawing Sheets

LOWERED PU POWER USAGE METHOD AND APPARATUS

TECHNICAL FIELD

The invention relates to a PU (processing unit) control and, more particularly, to placing a PU in a power suspended state upon detection of a given event external to the PU.

BACKGROUND

Normally, when a program running in a CPU or other PU (Central or other Processing Unit) is waiting upon some event external to the program, the program will run a poll loop where it will keep reading an event register, utilized by the PU in connection with the program, until the event that it is waiting upon occurs. While the program is operating the PU in polling the event register, the PU is not doing useful work although it is still running and all associated components, such as temporarily idle math logic units, are burning power.

Present day computer system processors are monitored by the operating system and put to sleep based upon inactivity and an interrupt is used to reawaken the processor. Involving the operating system is inefficient and is especially so when a multiprocessor environment is contemplated. Further, transactions such as processor-to-processor communications and "suspend" are not typically handled with interrupts.

It would thus be desirable to establish a method of and a PU control mechanism for maintaining at least some of the temporarily idle associated components of the PU, or alternatively the entire PU, into a low power, sleep or other power suspended state during times when the PU is not providing useful computations or other processor actions.

SUMMARY OF THE INVENTION

The present invention comprises using a PU control mechanism for allowing at least a portion of the CPU to go into and remain in a power suspended state, while awaiting an event response external to the PU.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

In the remainder of this description, a processing unit (PU) may be a sole processor of computations in a device. In such a situation, the PU is typically referred to as a CPU (central processing unit). The processing unit may also be one of many processing units that share the computational load according to some methodology or algorithm developed for a given computational device. Where there are more than one processing units on a single chip, these PUs are sometimes referred to as SPUs (special processing units). For the remainder of this discussion, all references to processors shall use the term PU whether the PU is the sole computational element in the device or whether the PU is sharing the computational with other PUs.

Figure 1:
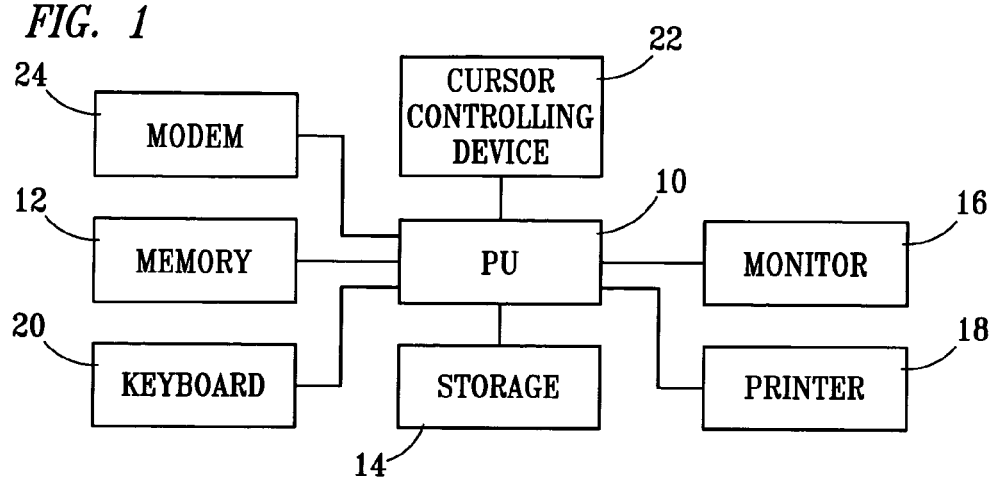
FIG. 1 is a block diagram of a computer including external devices supplying inputs thereto.

In FIG. 1, a PU 10 is illustrated connected to a variety of components such as memory 12, hard disk storage 14 and a monitor 16. In addition, there are shown various components such as a printer 18, a keyboard 20, a cursor controlling device like a mouse or trackball 22, and a modem 24 that supply responses to the PU in accordance with events such as a key being pressed on the keyboard 20, the printer 18 running out of paper or a button being pressed on the device 22.

Figure 2:
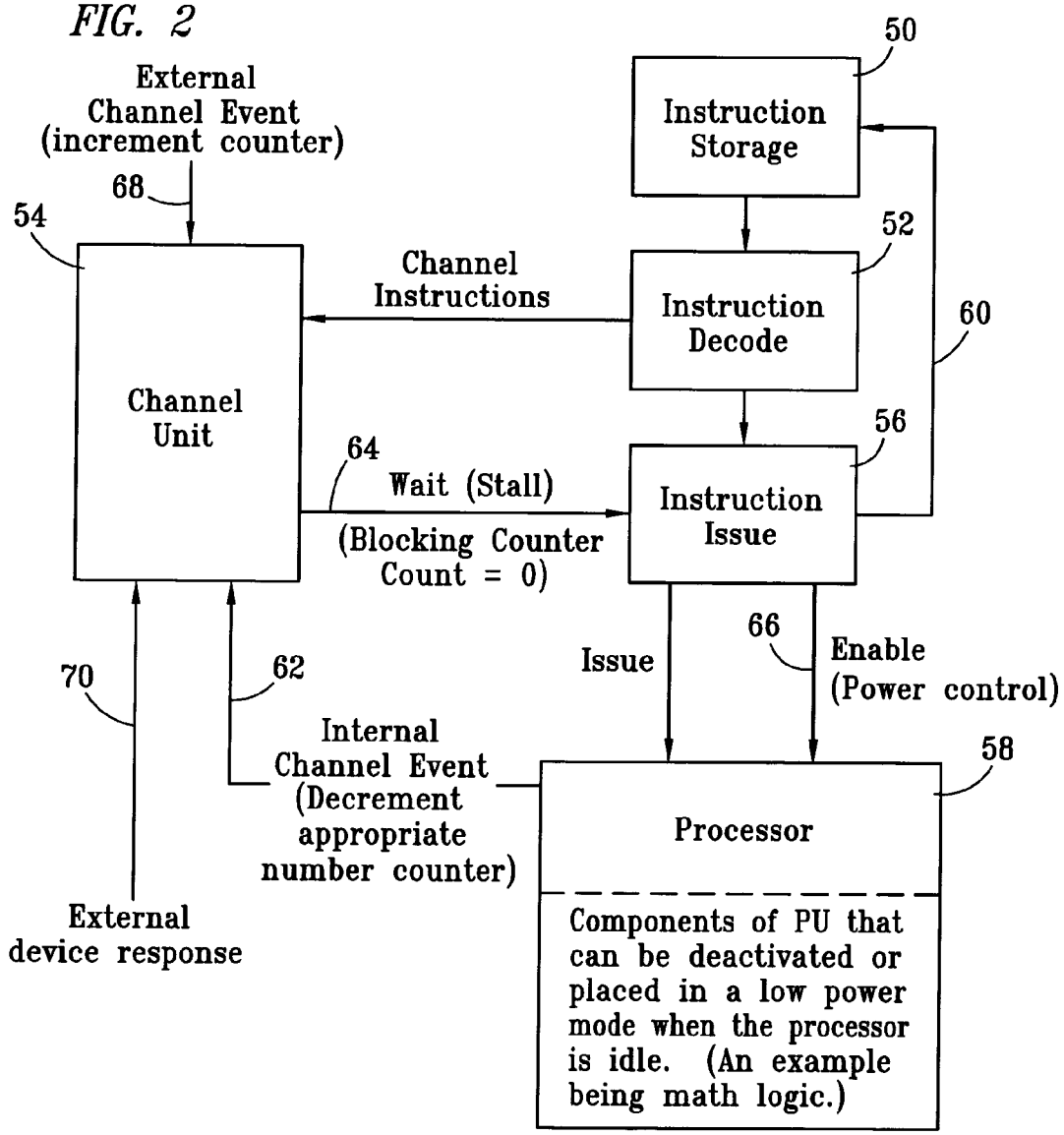
FIG. 2 comprises a more detailed block diagram of portions of the CPU of FIG. 1.

In FIG. 2, a block 50 represents a portion of memory containing computer program instructions. These instructions are supplied to an instruction decode block 52. The channel read and write operation instructions include a channel number and a target or source general purpose register in the processor where the data read from the channel is to be stored for channel read or read from for channel write operations. The block 52 modifies the appropriate channel counter in a block of counters for each of these type instructions. This modification may be either an increment or decrement and explained later.

In accordance with this invention, at least one of these channels is designated or known by the entity generating the program as a blocking channel. The block 52 passes the instruction to an instruction issue block 56, which issues the instruction to processor 58 and further notifies storage 50 that the instruction has been issued so that a further instruction may be submitted from block 50. The processor executes the instruction and on a lead 62 notifies the appropriate counter, in accordance with the channel number accompanying the instruction, to decrement its count for that channel. As shown, the processor will have many associated components, such as math logic and so forth, that are not used when the processor 58 has performed all received instructions and is waiting for further instructions. These components are indicated in the drawing beneath the dashed line of block 58. Examples of other components that may be put to sleep comprise fixed point math units, branch units, instruction decode units, instruction storage units, load/store units, and floating point math units. When the count for the blocking channel is some predetermined value, such as zero or empty (as illustrated) for a blocking read or a maximum number or full (not specifically illustrated) for a blocking write, a signal is passed via a lead 64 to block 56 to send a power control signal on a lead 66 to the processor 58. This signal, on lead 66, instructs the processor to shut down, or place in a low power mode, a predetermined set of components deemed nonessential to waking up the computer upon receipt of a response from an external device. External channel events from devices, such as the keyboard and other devices (including other processors in a multiprocessor system) shown in FIG. 1, are received by a channel unit block 54 on a lead designated as 68. The external event could be a separate signal, a transaction across an input bus, an internal counter, and so forth. Different channels may be used for each possible external event whereby the selected channel determines which external event is being waited on. If all external events are to be used to increment the blocking channel counter, the input 68 may be a single lead. However, if only some of the external devices are to be used in the sleep decision making process, input 68 may be a plurality of leads. The actual response from the external devices may travel to the processor in a variety of paths in accordance with the overall design approach for the PU. However, for simplicity in illustration, a lead(s) 70 is used for supplying the response to the channel unit 54. The receipt of this response signal is used to reactivate all the components put to sleep so that the response may be properly handled by the processor 58.

Figure 3:
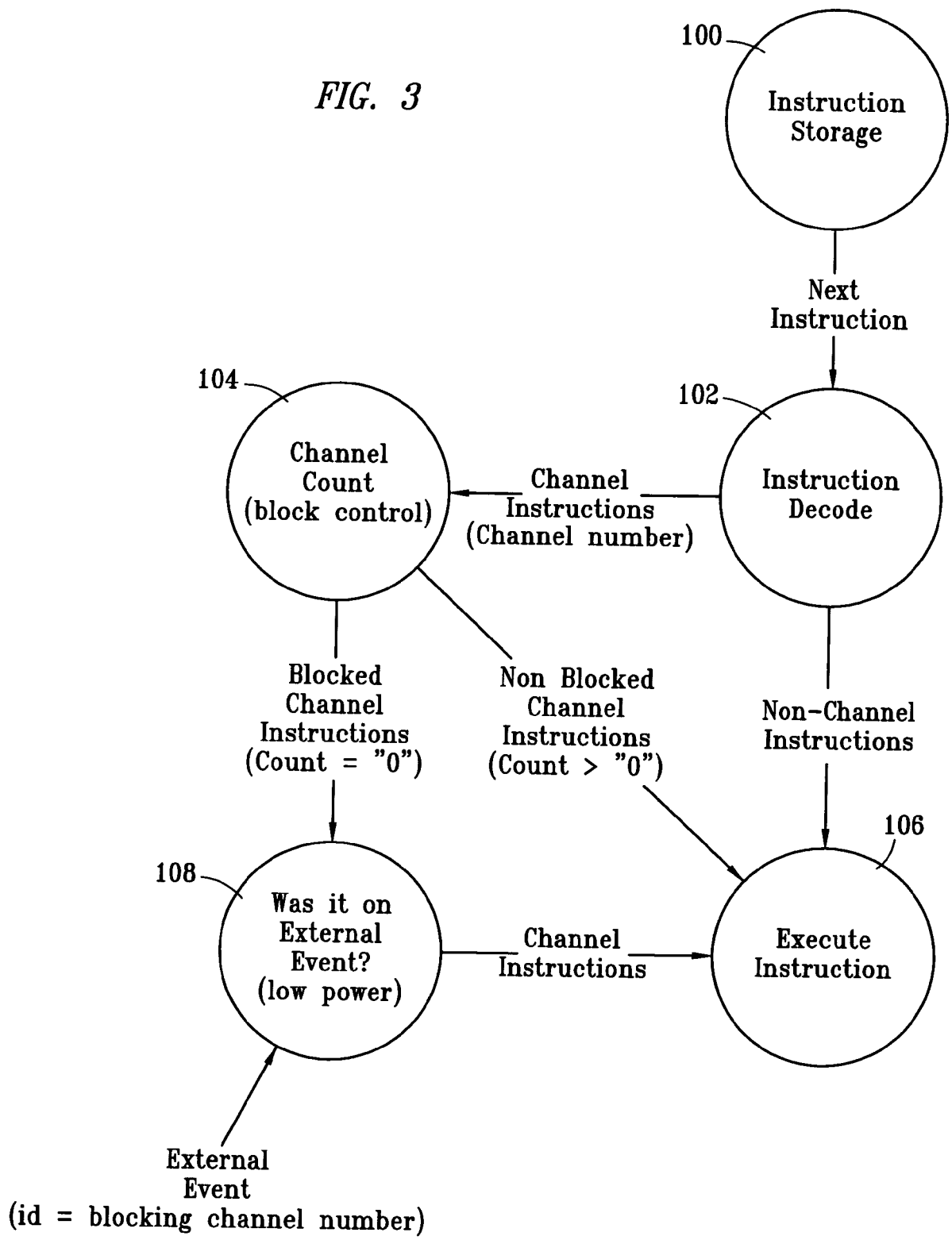
FIG. 3 illustrates a portion of a flow diagram for placing portions of a PU in a sleep mode while awaiting an event external to the PU.

As shown in the flow diagram of FIG. 3, processor instructions are sent one at a time from circle 100 to a decode step shown by a circle 102. The decode step 102 determines if the instruction is a channel instruction or a non-channel instruction and forwards the instruction to be handled within steps 104 or 106, respectively. The channel instructions, handled in step 104, cause a given channel to be incremented and forwarded to be executed by the processor in step 106, as long as the non-blocked channel count is greater than zero and less than full. If the blocked channel instruction count is either of the extremes, the process proceeds to a step shown as circle 108 where the processor is instructed to turn all temporarily idle components to a sleep or low power mode. When the process recognizes the occurrence of an external event in step 108 that removes the block, the processor is caused to reactivate all the components necessary to execute further instructions.

While the invention has been described in connection with a single PU, the invention may readily also be used in a multiprocessor environment where there are a plurality of PUs (Processor Units), only some of which are placed in a sleep mode at any given time.

Although, for convenience in illustration, the external device response 70 is shown applied directly to the PU 58 in FIG. 2, external event inputs typically will go through the bus interface unit. The response will then go either to an internal bus or an external interrupt controller.

So far the invention has been described in the manner of putting parts of a processor to sleep. The invention may however be implemented in many different manners. The only part that needs to stay awake is the channel (interface) unit itself, so that it can wake up the processor when an external event occurs. Thus, an alternate embodiment is to put the entire PU to sleep.

The above description, as a specific example or implementation of the invention, counts the number of items in the channel(s). If there are none (i.e., the count is zero), the processor is blocked from any action while awaiting data from the external environment source. Although not shown specifically, if the blocking channel is full of data yet to be transmitted to a destination internal or external, it again cannot continue to operate until some event (transaction) occurs external to the processor. It should be realized that there are other transactions that could be monitored by a blocking mechanism besides the amount of data in the blocking channel. An example of another transaction in a multiprocessor system that may be beneficially utilized in connection with the blocking mechanism is processor-to-processor communications.

As noted above, in the embodiment described in detail, a counter is incremented and decremented in accordance with the item count in a given register. However, the invention thrust is to put the processor or PU to sleep on any transaction that blocks further processing. The PU is then re-enabled by an event external to the PU that is being put to sleep. This external event may in some instances be occurring or originating on the same physical chip as contains the PU. As also referenced, in a multiprocessor environment, the external event may even originate from another PU on the same physical chip as the PU being put to sleep. In other words, depending upon the configuration of the computing device, an external event can come to a PU via an external interrupt signal or via a memory mapped I/O transaction or a direct channel command in an environment or computer configuration where the processing unit exposes the channel mechanism to the outside.

The above description of the invention has been directed to the process of putting the PU to sleep during times when it cannot accomplish any useful result. However, the process may alternatively be viewed from the standpoint of normally keeping the PU in a low power mode, except when there is useful work to be accomplished, at which time the PU is awakened for only the time that it can accomplish useful activity. A natural method of accomplishing this is to have activation signals accompany the issue of instructions. Hence, when no instructions are issued, no execution units are activated to process the instructions. In this case, the stall signal asserted by the channel unit when the processor attempts a channel operation that is blocked only directly affects the instruction issue logic, and the power savings are a consequence of the fact that no further instructions are issued until the stall signal is deasserted by the channel unit in response to an external event or transaction that unblocks the channel.

Although the invention has been described with reference to a specific embodiment, the description is not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A computer system, comprising:
    a channel unit comprising a counter corresponding to a data channel;
    a processor coupled to receive computer program instructions and a power control signal, wherein the processor is configured to execute the received computer program instructions, and wherein the processor comprises at least one component that is not used when the processor has executed all received computer program instructions and is waiting for further computer program instructions, and wherein the processor is configured to transition the at least one component to a low power mode in response to the power control signal;
    means for decrementing a count stored in the counter when the processor executes an instruction corresponding to the data channel;
    means for producing the power control signal in the event the count stored in the counter reaches a predetermined value;
    wherein the channel unit is configured to decrement the count stored in the counter when the processor executes an instruction corresponding to the data channel; and
    wherein the processor is configured to provide a signal to the channel unit in the event an instruction corresponding to the data channel is executed, and wherein the channel unit is configured to produce a wait signal in the event the count stored in the counter reaches the predetermined value.

2. The computer system as recited in claim 1, further comprising an instruction issue unit coupled to receive computer program instructions and the wait signal produced by the channel unit, wherein the instruction issue unit is configured to provide the computer program instructions to the processor and to respond to the wait signal by producing the power control signal.

3. A computer system, comprising:
a channel unit coupled to receive an external channel event signal corresponding to a data channel, wherein the channel unit comprises a counter corresponding to the data channel, and wherein the channel unit is configured to produce a wait signal;
an instruction issue unit coupled to receive computer program instructions and the wait signal produced by the channel unit, wherein the instruction issue unit is configured to provide the computer program instructions and to produce a power control signal;
a processor coupled to the channel unit and to receive the computer program instructions and the power control signal from the instruction issue unit, wherein the processor is configured to execute the received computer program instructions;
wherein the processor is configured to provide a signal to the channel unit in the event an instruction corresponding to the data channel is executed;
wherein the channel unit is configured to respond to the signal from the processor by decrementing a count stored in the counter, and to produce the wait signal in the even the count reaches a predetermined value;
wherein the instruction issue unit is configured to respond to the wait signal by producing the power control signal;
wherein the processor comprises at least one component that is not used when the processor has executed all received computer program instructions and is waiting for further computer program instructions; and
wherein the processor is configured to respond to the power control signal from the instruction issue unit by transitioning the at least one component to a low power mode.

4. The computer system as recited in claim 3, wherein the channel unit is configured to produce the wait signal in the event the count stored in the counter is a predetermined minimum value corresponding to a predetermined minimum amount of data in the data channel.

5. The computer system as recited in claim 3, wherein the channel unit is configured to produce the wait signal in the event the count stored in the counter is a predetermined maximum value corresponding to a predetermined maximum amount of data in the data channel.

6. The computer system as recited in claim 3, wherein the at least one component that is not used when the processor has executed all received computer program instructions and is waiting for further computer program instructions comprises a fixed point math unit, a branch unit, an instruction decode unit, an instruction storage unit, a load/store unit, or a floating point math unit.

7. The computer system as recited in claim 3, wherein the channel unit is configured to respond to the external channel event signal by incrementing the count stored in the counter.

8. A computer system, comprising:
a channel unit coupled to receive an external channel event signal corresponding to a blocking channel of a plurality of data channels, and wherein the channel unit comprises a plurality of counters each corresponding to a different one of the data channels, and wherein the channel unit is configured to produce a wait signal;
an instruction issue unit coupled to receive computer program instructions of an instruction set and the wait signal produced by the channel unit, wherein the instruction issue unit is configured to provide the computer program instructions and to produce a power control signal;
a processor coupled to the channel unit and to receive the computer program instructions and the power control signal from the instruction issue unit, wherein the processor is configured to execute the received computer program instructions;
wherein the processor is configured to provide a signal to the channel unit in the event an instruction corresponding to one of the data channels is executed;
wherein the channel unit is configured to respond to the signal from the processor by decrementing a count stored in the counter corresponding to the data channel, and to produce the wait signal in the event the count corresponding to the blocking channel is a predetermined value;
wherein the instruction issue unit is configured to respond to the wait signal by producing the power control signal;
wherein the processor comprises at least one component that is not used when the processor has executed all received computer program instructions and is waiting for further computer program instructions; and
wherein the processor is configured to respond to the power control signal from the instruction issue unit by transitioning the at least one component to a low power mode.

9. The computer system as recited in claim 8, wherein each of the data channels is assigned a different channel number, and wherein each of the computer program instructions corresponds to one of the data channels and comprises the channel number of the corresponding data channel.

10. The computer system as recited in claim 8, wherein the signal provided by the processor to the channel unit when a computer program instruction is executed comprises the channel number of the corresponding data channel.

11. The computer system as recited in claim 10, wherein the channel unit is configured to respond to the signal from the processor by decrementing the count stored in the counter corresponding to the data channel having the channel number.

12. The computer system as recited in claim 8, wherein the channel unit is configured to produce the wait signal in the event the count stored in the counter corresponding to the blocking channel is a predetermined minimum value corresponding to a predetermined minimum amount of data in the blocking channel.

13. The computer system as recited in claim 8, wherein the channel unit is configured to produce the wait signal in the event the count stored in the counter corresponding to the blocking channel is a predetermined maximum value corresponding to a predetermined maximum amount of data in the blocking channel.

14. The computer system as recited in claim 8, wherein the channel unit is configured to respond to the external channel event signal by incrementing the count stored in the counter corresponding to the blocking channel.

15. The computer system as recited in claim 8, wherein the instruction set comprises a channel read operation instruction, and wherein the channel read operation instruction comprises a channel number and identifies a register of the processor where data of the data channel having the channel number is to be stored.

16. The computer system as recited in claim 8, wherein the instruction set comprises a channel write operation instruction, and wherein the channel write operation instruction comprises a channel number and identifies a register of the processor where data of the data channel having the channel number is to be obtained.

* * * * *